United States Patent [19]

Yamada et al.

[11] Patent Number: 4,562,040

[45] Date of Patent: Dec. 31, 1985

[54] METHOD FOR MANUFACTURING HIGH-STRENGTH SINTERED SILICON CARBIDE ARTICLES

[75] Inventors: Koichi Yamada; Masahide Mouri, both of Niihama; Yoshisaburo Nomura, Uma, all of Japan

[73] Assignee: Sumitomo Aluminium Smelting Company, Ltd., Osaka, Japan

[21] Appl. No.: 721,663

[22] Filed: Apr. 9, 1985

[30] Foreign Application Priority Data

Apr. 13, 1984 [JP] Japan ................................. 59-74228

[51] Int. Cl.[4] ................................................ B22F 3/26
[52] U.S. Cl. ......................................... 419/23; 419/17; 419/32; 419/36; 419/37; 419/38; 419/39; 419/40; 419/41; 419/54; 419/57; 75/238; 75/244; 75/254; 75/950; 501/88; 501/90
[58] Field of Search ...................... 419/17, 23, 32, 36, 419/37, 38, 39, 41, 40, 57, 54; 75/238, 254, 950, 244; 501/88, 90

[56] References Cited

U.S. PATENT DOCUMENTS

| | | | |
|---|---|---|---|
| 4,124,667 | 11/1978 | Coppola et al. | 501/90 |
| 4,131,460 | 12/1978 | Orford | 419/8 |
| 4,179,299 | 12/1979 | Coppola et al. | 501/90 |
| 4,230,497 | 10/1980 | Schwetz et al. | 501/90 |
| 4,312,954 | 1/1982 | Coppola et al. | 501/90 |
| 4,346,049 | 8/1982 | Coppola et al. | 501/88 |
| 4,443,404 | 4/1984 | Tsuda et al. | 419/57 |
| 4,486,543 | 12/1984 | Leimer et al. | 501/88 |
| 4,495,122 | 1/1985 | Leimer et al. | 501/88 |

*Primary Examiner*—Stephen J. Lechert, Jr.
*Attorney, Agent, or Firm*—Wenderoth, Lind & Ponack

[57] ABSTRACT

The present invention relates to a method for manufacturing a high-strength sintered silicon carbide article and more particularly, to a method for a sintered silicon carbide article having high mechanical strength by mixing a finely divided silicon carbide powder with the definite amounts of a specific carbon-containing material, a boron compound and silicon powder as densification aids, shaping and then sintering said shaped article under an inert atmosphere.

9 Claims, No Drawings

METHOD FOR MANUFACTURING HIGH-STRENGTH SINTERED SILICON CARBIDE ARTICLES

A sintered silicon carbide article has excellent physical and chemical properties, and, in particular, has high strength and excellent corrosion resistance and its mechanical properties do not change even at a high temperature as compared with those at a normal temperature. Therefore, a sintered silicon carbide has been regarded as promising as a wear-resistant material and as a high-temperature structural material. However, as it is hard to sinter, it is difficult to sinter it into a high-density sintered article, so that sintering by a hot press method and sintering by using densification aids have been proposed.

For example, in Japanese Patent Publication No. 32035/1982, it was disclosed that a sintered silicon carbide article having a sintered density of 85% or greater of the theoretical density value is manufactured by sintering a homogeneous dispersion of powder particles of a size of 1 micron or less consisting essentially of beta phase silicon carbide, a boron compound in an amount corresponding to 0.3–3.0% by weight of boron and a carbon source in an amount corresponding to 0.1–1.0% by weight of elemental carbon in an atmosphere chemically inert to silicon carbide at a temperature of from 1900° to 2100° C. Further, in Japanese Patent Laid-Open No. 148712/1976, it was disclosed that a sintered silicon carbide article having a sintered density of 2.40 g/cm$^3$ or greater is manufactured by admixing 91–99.35 parts by weight of alpha phase silicon carbide powder having a specific surface area of 1–100 m$^2$/g with 0.67–20 parts by weight of a carbonizable, organic solvent-soluble organic material having a carbonization ratio of 25–75% by weight, a definite amount of a boron compound containing 0.15–3.0 parts by weight of boron component and 5–15 parts by weight of a temporary binding agent which is consumed under a sintering condition, and then sintering the resulting mixture. However, although a sintered silicon carbide article having high sintered density is obtained by the said method, the mechanical strength of the sintered article is not always satisfactory and, for example, a sintered silicon carbide article having a bending strength exceeding 50 kg/mm$^2$ could not be obtained by the known methods. The present inventors studied previously on the effect of boron and carbon as densification aids on mechanical properties of sintered silicon carbide articles and found that a high-strength sintered silicon carbide article could be manufactured by adding coal tar pitch or oil tar pitch in such an amount as to provide 4.2–6 parts by weight of carbon after being carbonized and a boron compound in such an amount corresponding to 0.03–0.15 parts by weight of boron content as densification aids to 100 parts by weight of a finely divided silicon carbide powder and mixing, shaping the resulting mixture, and then sintering the shaped article.

However, as a large amount of a tar pitch added was necessary to obtain a sinter article high in sintered density in the above-mentioned method, there are some defects that the density of green articles is now, thermal decomposition of organic substance added takes a long time, its productivity is inferior, and the dimentional accuracy of sintered articles is poor.

Under these circumstances, the present inventors have further studied to conquer these defects and, as a result, found that the amount of tar pitch added could be reduced by addition of a small amount of silicon. Thus, the present invention has been completed.

In accordance with the present invention, there is provided a method for manufacturing a sintered silicon carbide article excellent in mechanical properties which comprises the steps of adding a tar pitch in an amount of 2–10 parts by weight, a boron compound in such an amount corresponding to 0.03–0.15 parts by weight of boron content and silicon powder in an amount of 0.3–3 parts by weight as densification aids to 100 parts by weight of a finely divided silicon carbide powder and mixing, shaping the resulting mixture, and then sintering the shaped green article in an inert atmosphere at a temperature of from 1900° to 2300° C.

The present invention will be explained in detail hereinafter.

In the present invention, as a finely divided silicon carbide powder, it is suitable to employ a silicon carbide powder consisting essentially of a silicon carbide selected from the group consisting of alpha phase silicon carbide ($\alpha$-phase), beta phase silicon carbide ($\beta$-phase) and mixture thereof. Further, it is preferred to use a silicon carbide powder having an average particle size of 1 micron or less. These silicon carbide generally include 0.2–2% by weight of free carbon, but the starting material of the present invention is also the same.

In the present invention, a tar pitch in an amount of 2–10, preferably 3–6 parts by weight, a boron compound in such an amount corresponding 0.03–0.15, preferably 0.05–0.15 parts by weight of boron content and silicon powder in an amount of 0.3–3, preferably 0.5–1 parts by weight, as densification aids, are added to and mixed with 100 parts by weight of a silicon carbide powder.

When the amount of a silicon powder added to the silicon carbide powder is less than 0.3 parts by weight, the silicon powder has not an effect of restraining the grain growth of silicon carbide and it is impossible to obtain a sintered article having a high sintered density, so that such a low addition amount is not suitable. On the other hand, when the amount of silicon powder added exceeds 3 parts by weight, silicon evaporates at a temperature exceeding its melting point leaving pores formed and the mechanical strength of the sintered article is lowered, so that such a high addition amount is not suitable. It is preferred that silicon to be added is fine powder but when the silicon powder is too fine, the oxidized layer on the surface of the powder particles increases, so that silicon powder having a particle size of about 0.1–10 microns is used.

As the boron compound, the compound able to be stable up to the sintering, temperature such as boron, or boron carbide, is used. When the amount of boron compound added is less than the amount corresponding 0.03 parts by weight of boron content, it is impossible to obtain a sintered article having a high sintered density. On the other hand, when the amount of a boron compound exceeds the upper limit, it is possible to obtain a sintered article having a high sintered density, but the mechanical strength of a sintered article lowers unfavorablly, so that the object of the present invention can not be attained.

The tar pitch used in the invention as a densification aid is a commercial coal or oil tar pitch and preferred to use an organic solvent-soluble coal tar pitch or oil tar pitch having a carbonization ratio of 40–60% by weight. And the tar pitch is mixed uniformly with silicon carbide powder in the form of its solution in an organic solvent such as benzene, quinoline, anthracene, or the like or in the form of its emulsion in water. When the amount of tar pitch added to the silicon carbide powder is less than 2 parts by weight, the tar pitch has not a sufficient effect of restraining the growth of crystal grain of silicon carbide and also has not an effect of removing smoothly the oxide layer on the surface of a shaped article, so that the sintered article has a low sintered density.

On the other hand, when the amount of tar pitch added exceeds 10 parts by weight, the green compact has a lowered density, thermal decomposition of the tar pitch requires a long time and its productivity for the sintered article is inferior, so that such a large addition amount is not preferred.

In the present invention, the definite amount of a silicon carbide powder and the above-mentioned amounts of a boron compound, a tar pitch and silicon powder are mixed uniformly using an organic solvent such as benzene, quinoline, anthracene, or the like or water and than the resulting mixture is shaped by a known slip coating method, or the resulting mixture is spray dried to obtain the mixture granules, which are then press-molded into an objective article by a known method. As the other molding method, the starting materials comprising a silicon carbide powder, a boron compound, a tar pitch and silicon powder are admixed uniformly with an organic binder or water and then the admixture is mold into a shaped article by a known extrusion molding, injection molding or the like. If desired, the thus shaped article is subjected to machine or to treat the removal of binder. As regards the sintering conditions, the shaped article to a desired form is sintered in an inert atmosphere such as argon, helium, nitrogen or the like at a temperature of from 1900° to 2300° C. for a period of time from 10 minutes to 10 hours. When the sintering temperature is lower than 1900° C., the resulting sintered article has a low sintered density, and when the sintering temperature exceeds 2300° C., the evaporation of silicon carbide and the coarse growth of crystal grains occurs and the resulting sintered article has low mechanical strength, so that such a high sintering temperature is not preferred.

It is not fully understood the reason that according to the present invention it is possible to obtain a sintered article having a high sintered density and excellent mechanical strength. However, as a result of investigating of sintered articles for analytical experiments, it has been found that using of the tar pitch as the densification aid in the present invention restrains the growth of crystal grains of silicon carbide and has a markedly excellent effect of removing the oxide layer on the surface of a shaped article when a green shaped article is calcined at a temperature of 1200° C. or higher. As the result, the sintering takes effect in the presence of smaller amount of boron as densification aids than that in the conventional method when the shaped article of silicon carbide is sintered in a sintering temperature of 1900° C. or higher. Further, the addition of silicon powder as the densification aid in the invention restrains the decomposition and evaporation of silicon carbide caused by the surface diffusion and vapor phase diffusion of silicon component of silicon carbide on particle surfaces when grains of silicon carbide grow are restrained by the presence of silicon powder. As a result, a high-density sintered article can be prepared without a lowering in its mechanical strength even in the presence of a reduced amount of tar pitch.

In the above, according to the present invention thus described in detail, it has become possible to produce a high-density, high-strength sintered silicon carbide article having a sintered density of at least 90%, preferably 95% or more of the theoretical density of the sintered article and mechanical strength (bending strength) of 50 kg/mm$^2$ or higher by using a tar pitch, a boron compound and silicon powder in the specified amounts as densification aids.

Thus, the present invention has great industrial significance as a method for manufacturing an industrially mechanical parts such as turbine blade, pump and the like.

The present invention is further described in detail below according to an example, which is not, however, limitative of the present invention.

EXAMPLE 1

After 6 g of coal tar pitch (having a carbon yield of 45% by weight after being carbonized) was dissolved in 9 g of quinoline, 200 g of benzene was added to the solution and mixed sufficiently. To the resulting solution, 100 g of α-phase silicon carbide having a silicon carbide content of 96% by weight and a BET specific surface area of 9 m$^2$/g, 0.15 g of boron carbide powder passing through 1200 mesh and 0.5 g of silicon powder having an average particle size of 3 microns were added and the mixture was mixed for 3 hours using a plastics ball mill. The resulting mixture was dried at 60° C. in a nitrogen gas stream, and then after the dried powder was pulverized, it was sieved using a 180 mesh screen. After the resulting pulverized mixed powder was cold pressed, it was charged into a rubber mold and then subjected to hydrostatic pressure press compacting under compacting pressure of 2 tons/cm$^2$ to prepare a green shaped article having dimensions of 50×30×4 mm. The pressed compact had a bulk density of 1.7 g/cm$^3$.

Subsequently, after the said green article was calcined at 600° C. for 1 hour in an argon gas stream, it was further sintered at 2050° C. for 30 min in an argon gas atmosphere. The resulting sintered article has a sintered density of 3.12 g/cm$^3$, and 3 point bending strength (JIS R-1601) of 60 kg/mm$^2$.

COMPARATIVE EXAMPLE 1

A comparative silicon carbide sintered article was prepared under the same conditions as in Example 1 except no addition of silicon powder, and the thus obtained sintered article had a sintered density of 2.85 g/cm$^3$ and 3 point bending strength of 32 kg/mm$^2$.

EXAMPLES 2-3 AND COMPARATIVE EXAMPLES 2-8

Sintered silicon carbide articles were prepared under the same conditions as in Example 1 except using of raw materials as shown in Table 1. The density of the green articles and the sintered density and bending strength of the sintered articles are shown in Table 1.

TABLE 1

| | Silicon carbide 100 parts by weight | Boron carbide (pts. by weight) | Pitch (pts. by weight) | Silicon (pts. by weight) | Compact density (g/cm³) | Sintering temp. (°C.) | Sintered density (g/cm³) | Bending strength (kg/mm²) |
|---|---|---|---|---|---|---|---|---|
| Example 2 | alpha 9 m²/g | 0.15 | 6 | 1.0 | 1.7 | 2050 | 3.15 | 62 |
| Example 3 | beta 9 m²/g | 0.15 | 6 | 0.5 | 1.8 | 2050 | 3.10 | 60 |
| Comparative example 2 | alpha 9 m²/g | 0.2 | 6 | 1.0 | 1.7 | 2050 | 3.15 | 45 |
| Comparative example 3 | alpha 9 m²/g | 0.02 | 6 | 1.0 | 1.7 | 2050 | 2.60 | 25 |
| Comparative example 4 | alpha 9 m²/g | 0.15 | 12 | 1.0 | 1.5 | 2050 | 3.05 | 50 |
| Comparative example 5 | alpha 9 m²/g | 0.15 | 1 | 1.0 | 1.75 | 2050 | 2.40 | 20 |
| Comparative example 6 | alpha | 0.15 | 6 | 5.0 | 1.65 | 2050 | 2.85 | 28 |
| Comparative example 7 | alpha 9 m²/g | 0.15 | 6 | 1.0 | 1.7 | 1800 | 2.35 | 20 |
| Comparative example 8 | alpha 9 m²/g | 0.15 | 6 | 1.0 | 1.7 | 2350 | 3.0 | 30 |

What is claimed is:

1. A method for manufacturing a sintered silicon carbide article excellent in mechanical properties comprising the steps of adding a tar pitch in an amount of 2-10 parts by weight, a boron compound in such an amount corresponding to 0.3-0.15 parts by weight of boron content and silicon powder in an amount of 0.3-3 parts by weight as densification aids to 100 parts by weight of a finely divided silicon carbide powder and mixing, shaping the resulting mixture, and then sintering the shaped green article in an inert atmosphere at a temperature of from 1900° to 2300° C.

2. A method according to claim 1 wherein the silicon carbide powder consist essentially of a silicon carbide selected from the group consisting of alpha phase silicon carbide, beta phase silicon carbide and mixture thereof.

3. A method according to claim 1 wherein the finely divided silicon carbide powder has an average particle size of 1 micron or less.

4. A method according to claim 1 wherein the tar pitch is an organic solvent-soluble coat tar pitch or oil tar pitch having a carbonization ratio of 40-60% by weight.

5. A method according to claim 1 wherein the boron compound is at least one member selected from the group consisting of boron and boron carbide.

6. A method according to claim 1 wherein the silicon carbide powder, boron compound, silicon powder and tar pitch are mixed uniformly using an organic solvent or water and the resulting mixture is shaped by slip casting.

7. A method according to claim 1 wherein the silicon carbide powder, boron compound, silicon powder and tar pitch are mixed uniformly using an organic solvent or water, the resulting dispersion is spray dried to obtain the mixture granules and the mixture granules are molded into a desired shape by press-molding.

8. A method according to claim 1 wherein the silicon carbide powder, boron compound, silicon powder and tar pitch are admixed uniformly with an organic binder and then the admixture is molded into a shaped article by extrusion molding or injection molding.

9. A method according to claim 1 wherein the inert atmosphere is argon, helium or nitrogen gas atmosphere.

* * * * *